United States Patent
Aoyama et al.

(10) Patent No.: US 8,035,640 B2
(45) Date of Patent: Oct. 11, 2011

(54) RESTORING AND COLLATING SYSTEM AND METHOD FOR 3-DIMENSIONAL FACE DATA

(75) Inventors: Norimasa Aoyama, Tokyo (JP); Yuji Kurita, Aichi (JP); Katsumi Ando, Aichi (JP)

(73) Assignee: NEC Corporation, Tokyo (JP)

( * ) Notice: Subject to any disclaimer, the term of this patent is extended or adjusted under 35 U.S.C. 154(b) by 988 days.

(21) Appl. No.: 11/727,850

(22) Filed: Mar. 28, 2007

(65) Prior Publication Data

US 2007/0229499 A1 Oct. 4, 2007

(30) Foreign Application Priority Data

Mar. 29, 2006 (JP) ................................. 2006-091066

(51) Int. Cl.
*G06T 17/00* (2006.01)
(52) U.S. Cl. ........................................................ 345/420
(58) Field of Classification Search .................. None
See application file for complete search history.

(56) References Cited

U.S. PATENT DOCUMENTS

| | | | |
|---|---|---|---|
| 6,381,346 B1* | 4/2002 | Eraslan | 382/118 |
| 6,381,613 B1* | 4/2002 | Gallery et al. | 707/104.1 |
| 6,775,403 B1* | 8/2004 | Ban et al. | 382/154 |
| 7,221,809 B2* | 5/2007 | Geng | 382/280 |
| 7,362,886 B2* | 4/2008 | Rowe et al. | 382/118 |
| 7,415,152 B2* | 8/2008 | Jiang et al. | 382/154 |
| 7,583,271 B2* | 9/2009 | Kawakami et al. | 345/582 |
| 7,657,083 B2* | 2/2010 | Parr et al. | 382/155 |
| 2004/0175039 A1* | 9/2004 | Miller | 382/181 |
| 2006/0039600 A1* | 2/2006 | Solem et al. | 382/154 |
| 2006/0210148 A1* | 9/2006 | Nakashima | 382/154 |

FOREIGN PATENT DOCUMENTS

| | | |
|---|---|---|
| EP | 1 372 109 A2 | 12/2003 |
| JP | 4-242106 | 8/1992 |
| JP | 6-259532 A | 9/1994 |
| JP | 9-259271 | 10/1997 |
| JP | 2001-229400 | 8/2001 |
| JP | 2003-6645 A | 1/2003 |
| JP | 2004-086929 | 3/2004 |
| JP | 2004-185386 | 7/2004 |
| WO | WO 99/27838 A2 | 6/1999 |

OTHER PUBLICATIONS

Xin et al. "Automatic 3D Face Modeling from Video" Oct. 2005, Computer Vision, 2005, ICCV 2005. Tenth IEEE International Conference, p. 5.*
Akamatsu, Shigeru, "Recognition of Faces by Computers-Survey", The Institute of Electronics, Information and Communications Engineers Journal, vol. J, 80-A, No. 8, Aug. 1997, pp. 1215-1230.
Blanz, Volker and Vetter, Thomas, "A Morphable Model for the Synthesis of 3D Faces", Max-Planck Institute for Biology, 1999, pp. 187-194.
Japanese Office Action dated May 12, 2009 with partial English-language translation.
Canada Office Action dated Oct. 1, 2010.

* cited by examiner

*Primary Examiner* — Ulka Chauhan
*Assistant Examiner* — Andrew G Yang
(74) *Attorney, Agent, or Firm* — McGinn IP Law Group, PLLC

(57) ABSTRACT

A 3-dimensional face data restoring and collating system includes a 2-dimension face image storage unit configured to store a plurality of 2-dimensional face images of persons, and a 3-dimensional face restored shape storage unit. A 3-dimensional face shape restoring unit restores a 3-dimensional face shape data from one of the plurality of 2-dimensional face images for a target one of the persons based on a 3-dimensional reference face shape data, and stores the 3-dimensional restored face shape data in the 3-dimensional face restored shape storage unit.

15 Claims, 11 Drawing Sheets

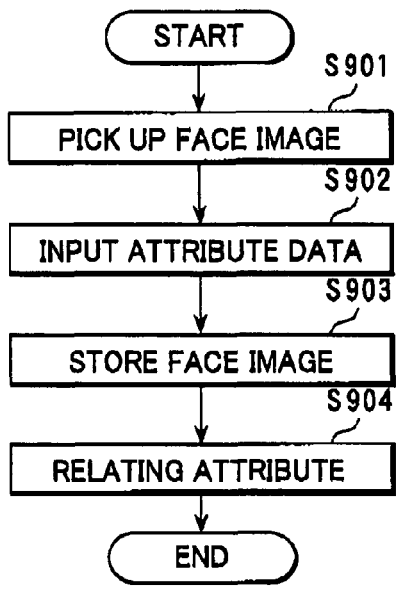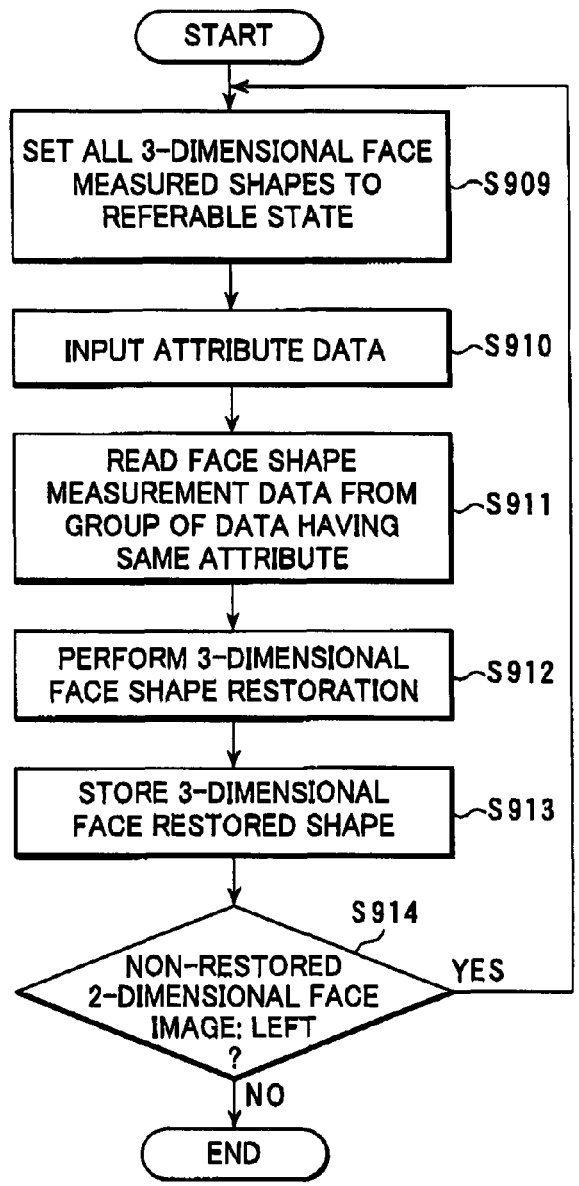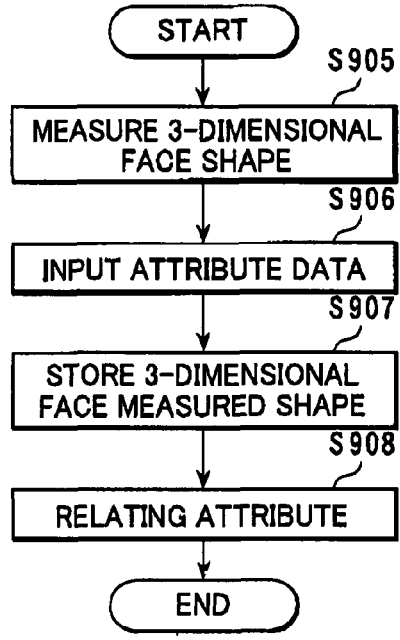

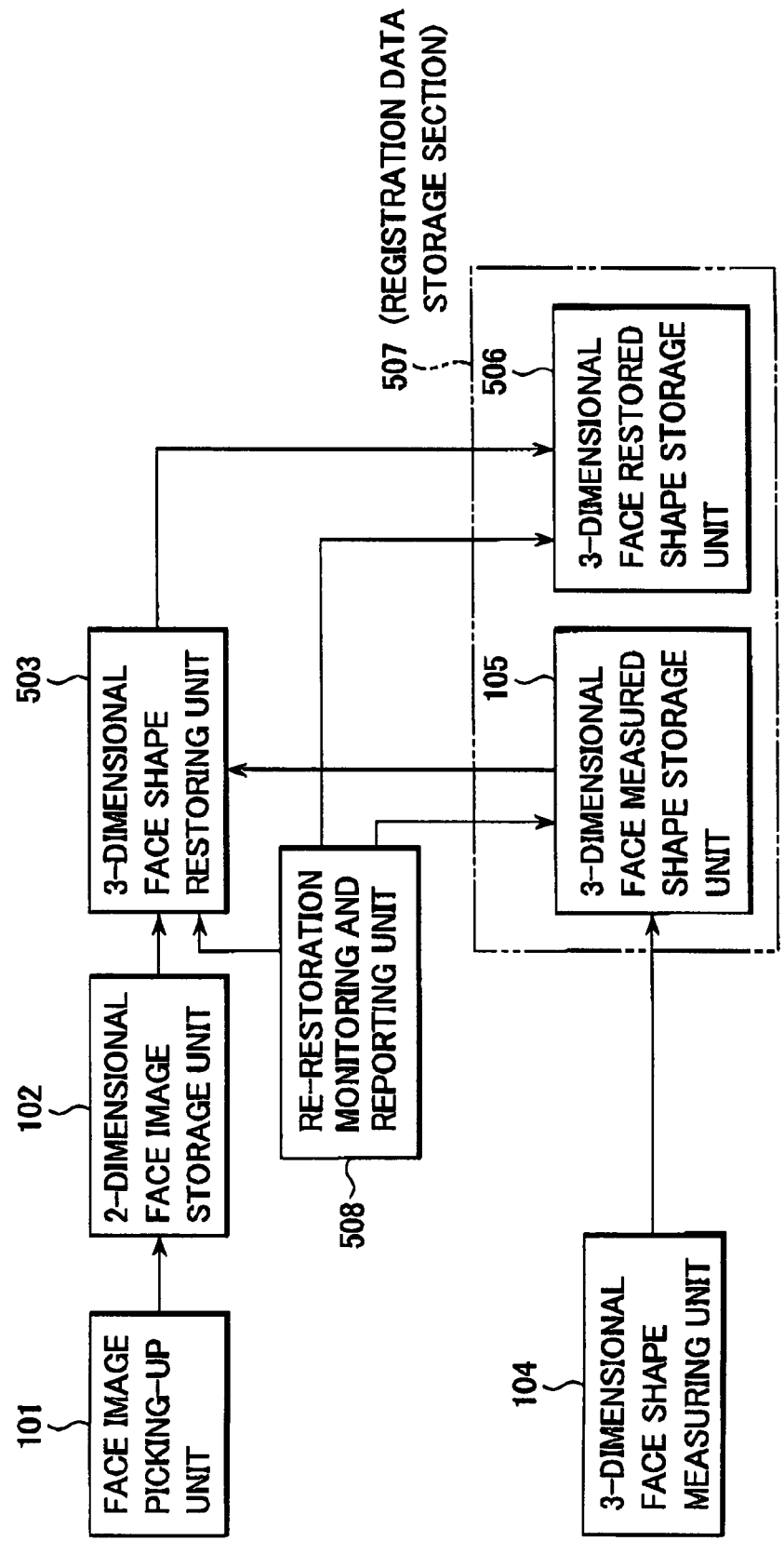

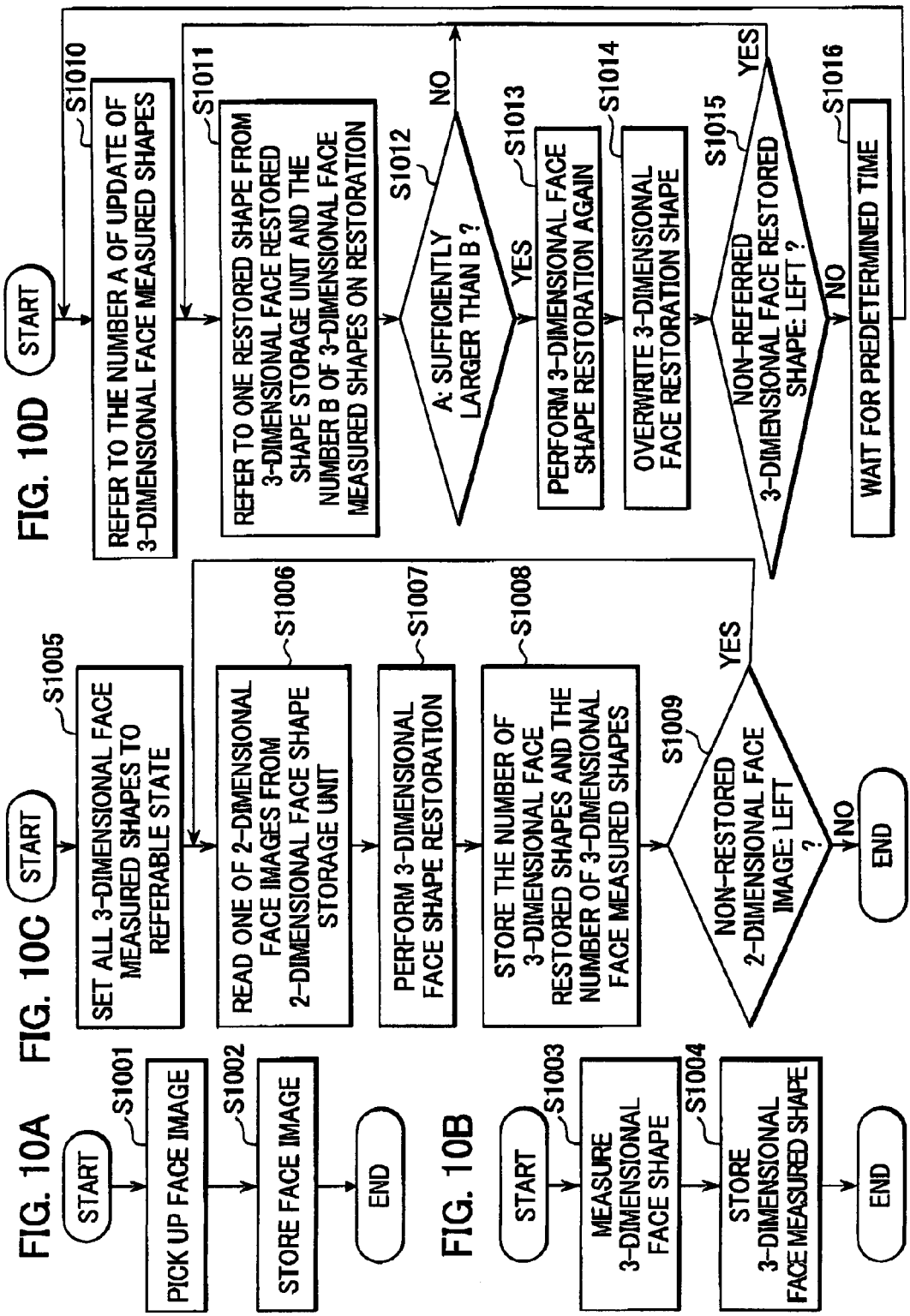

RESTORING AND COLLATING SYSTEM AND METHOD FOR 3-DIMENSIONAL FACE DATA

BACKGROUND OF THE INVENTION

1. Field of the Invention

The present invention relates to an individual authentication technique that uses a face data in the field of biometric authentication. In particular, the present invention relates to 3-dimensional face data registering, restoring and collating system and method, in which it is aimed to improve reduction of authentication accuracy caused due to change in a facing orientation, lighting, which are obstructions to perform face authentication.

2. Description of the Related Art

A process of an individual authentication system using the biometrics is separated into a "registering process" for registering a data of an authentication target to a database in advance, and a "collating process" for determining a likelihood that indicates whether or not an image is likely to be of the target by collating a target image with images data registered in the database one by one.

The face authentication uses a feature data of a face as the data to be registered and collated. The mainstream of a method for extracting the face feature data is a method that uses a 2-dimensional front face image, which is disclosed in "Recognition of Faces by Computers—Survey" by Shigeru Akamatsu, (IEICE (The Institute of Electronics, Information and Communication Engineers) Journal A Vol. J, 80-A, No. 8, August, 1997, pp. 1215-1230: first conventional example). As a specific methods, there are methods that are disclosed in the first conventional example, e.g. a "structural base method" in which the face parts such as eyes, a nose, and a mouth are detected from a 2-dimensional face image, and the face features are recognized and collated based on geometric characteristics of those parts, and a "pattern matching method" in which contrast values of the 2-dimensional face image are regarded as a set of vectors, and a peculiar face is calculates through an analysis of the main component thereof to recognize and collate the feature of the face. Both of these methods extract feature quantities form the 2-dimensional face image, and calculate the likelihood through a comparison and collation.

However, these methods for extracting the feature quantities from the 2-dimensional face image are likely to be affected by factors such as a facing orientation, lighting, and expression, which are different from those at the time of registration, and by secular changes due to over the years from the time of the registration. To deal with this, there are known face authentication systems which use the 3-dimensional data face to reduce the affect of those change factors, as disclosed in Japanese Laid Open Patent Applications (JP-P2004-086929A and JP-A-Heisei 09-259271: second and third conventional examples). In addition, a method is studied that restores a 3-dimensional face shape data from 2-dimensional face images of a front face image, a profile, and the like, without using a 3-dimensional face measuring apparatus as disclosed in "A Morphable Model for The Synthesis of 3D Faces" by Volker Blanz, and Thomas Vetter (SIGGRAPH99, 1999: fourth conventional example).

In conjunction with the above description, an image processing apparatus is disclosed in Japanese Laid Open Patent Application (JP-P2001-229400A). The image processing apparatus in this conventional example has an image input section for inputting a face image. A display section displays the face image inputted from the image input section and a message for prompting a user to specify a display position of a facial part of the face image. An input section used to input an optional point on the display. A facial part extracting section sets the point inputted from the input section as an origin and extracts another facial part based on the origin. An image generating section generates a 3-dimensional image based on the facial parts extracted by the facial part extraction section and coordinate data of the inputted origin.

Also, an image collating apparatus is disclosed in Japanese Laid Open Patent Application (JP-P2004-185386A). The image collating apparatus in this conventional example collates a first 2-dimensional image and a second 2-dimensional image. An image converting section converts the first 2-dimensional image into a 3-dimensional image. A direction detecting section detects a picking direction of a target in the second 2-dimensional image. An image generating section generates a third 2-dimensional image when the target is seen from the direction based on the 3-dimensional image. An image collating section collates the second 2-dimensional image and the third 2-dimensional image.

Also, a face recognizing apparatus is disclosed in Japanese Laid Open Patent Application (JP-A-Heisei 4-242106). In the face recognizing apparatus in this conventional example, a shape measuring section measures 3-dimensional shape of a face in X-, Y-, and Z-directions. A correcting section corrects a face orientation based on a 3-dimensional shape data. A feature point extracting section extracts feature points of the face based on the corrected 3-dimensional shape data. A collating section collates the extracted feature points and feature points on a database. The correcting section includes a first correcting section directions around the Y-axis and the Z-axis, and a second correcting section a direction around the X-axis. The second correcting section rotates the feature data around the X-axis in correspondence with a line on the Y-Z plane corresponding to an angle θ between the Y-axis and a line corresponding to a ridgeline of a nose obtained as the feature points on the Y-Z plane.

In the face authentication system of the above-described conventional examples, it is necessary to supply the 3-dimensional face data in the registering process or the collating process. For this purpose, an expensive 3-dimensional face measuring apparatus is required. Also, it requires a picking-up time of several hundreds milliseconds for the measurement, which is longer than that of a still camera. Thus, there are various kinds of problems which are the obstacles for putting it into a practical use.

Further, identification/selection of suspects in criminal investigations can be considered as an object for introducing the face authentication system. However, it is necessary to build up a database of criminals by using the 3-dimensional face measuring device. Thus, a great amount of resources are required to perform 3-dimensional face measurement additionally, etc. For this reason, the system cannot be effectively operated for a long period from the time point that the system is introduced until data are sufficiently registered on the database.

Moreover, in the method disclosed in the fourth conventional example, in which the 3-dimensional data of the face is restored from the 2-dimensional images of a front face image or a profile image without using the 3-dimensional face measuring apparatus, it can be considered that the 3-dimensional face measuring apparatus becomes unnecessary by restoring the 3-dimension face shapes from face photographs of criminals that are stored through criminal investigations and registering these data to the database. However, in this method, restoration of the face is performed by referring to the 3-dimensional face measured shape of others. Therefore, sufficient restoration accuracy cannot be obtained if there are only a small number of 3-dimensional face measured shapes. Thus, it is a critical problem for this method to increase the number of the 3-dimensional face measured shapes for reference.

As described, the first problem in the above-described conventional examples is that the face authentication system using the 3-dimensional data in the criminal investigations or the like cannot be operated effectively for a long period from the time point that the system is introduced. The reason is that it does not function as the system unless there is a sufficient amount of measured data obtained by using the 3-dimensional face measuring apparatus stored in the registered database. In particular, a considerable number of registered data is required for the system to be used effectively in the criminal investigations, so that a loss-time is generated for an extremely long term.

Further, the second problem is that the restoration accuracy is reduced when the database is built by using the technique for restoring the 3-dimensional shape of the face from the 2-dimensional face images of a front face image and a profile image without using the 3-dimensional face measuring apparatus. The reason is that the restoration accuracy in the technique for restoring the 3-dimensional face shape depends on the number of 3-dimensional face measured shapes of others for reference. Sufficient restoration accuracy cannot be obtained when the number is small.

SUMMARY OF THE INVENTION

Therefore, an object of the present invention is to provide 3-dimensional face data registering, recovering and collating system and method, which allow efficient individual authentication, even if there are variation factors such as the facing orientation and the lighting.

In an aspect of the present invention, a 3-dimensional face data restoring and collating system includes a 2-dimension face image storage unit configured to store a plurality of 2-dimensional face images of persons; a 3-dimensional face restored shape storage unit; and a 3-dimensional face shape restoring unit configured to restore a 3-dimensional face shape data from one of the plurality of 2-dimensional face images for a target one of the persons based on a 3-dimensional reference face shape data, and to store the 3-dimensional restored face shape data in the 3-dimensional face restored shape storage unit.

Here, the 3-dimensional face data restoring and collating system may further include a 3-dimensional face measured shape storage unit configured to store 3-dimensional measured face shape data as the 3-dimensional reference face shape data. The 3-dimensional face shape restoring unit may restore the 3-dimensional face shape data from the 2-dimensional face image for the target person based on the 3-dimensional measured face shape data corresponding to the 2-dimensional face image.

Also, the 3-dimensional face data restoring and collating system may further include a 3-dimensional face shape initial data storage unit configured to store a 3-dimensional face shape initial data as the 3-dimensional reference face shape data. The 3-dimensional face shape restoring unit may restore the 3-dimensional face shape data from the 2-dimensional face image for the target person based on the 3-dimensional face shape initial data.

Also, the 3-dimensional face data restoring and collating system according to claim 2 or 3, wherein a registration data storage section for a collating process comprises the 3-dimensional face restored shape storage unit and the 3-dimensional face measured shape storage unit.

Also, the 3-dimensional face data restoring and collating system may further include a 3-dimensional face shape initial data storage unit configured to store the 3-dimensional face shape initial data. The 3-dimensional face shape restoring unit may restore the 3-dimensional face shape data from the 2-dimensional face images based on the 3-dimensional face shape initial data when there is no 3-dimensional measured face shape data corresponding to the 2-dimensional target face image.

Also, the 3-dimensional face data restoring and collating system may further include a registration data matching unit configured to monitor whether the 3-dimensional restored face shape data and 3-dimensional measured face shape data of an identical person are stored in both of the 3-dimensional face restored shape storage unit and the 3-dimensional face measured shape storage unit, and to delete the 3-dimensional restored face shape data from the 3-dimensional face restored shape storage unit when the 3-dimensional restored face shape data and 3-dimensional measured face shape data of an identical person are stored in both of the 3-dimensional face restored shape storage unit and the 3-dimensional face measured shape storage unit.

Also, the 3-dimensional face data restoring and collating system may further include an attribute data storage unit configured to store attribute data of the target person in the 2-dimensional face image storage unit and the 3-dimensional face measured shape storage unit for the 2-dimensional face image and the 3-dimensional measured face shape data, respectively; and a 3-dimensional face shape selecting unit configured to select the 3-dimensional face measured shape data having the attribute data close to the attribute data corresponding to the 2-dimensional face image from the 3-dimensional face measured shape storage unit and to output to the 3-dimensional face shape resorting unit, when the 3-dimensional face shape restoring unit restores the 3-dimensional face shape data from the 2-dimensional face image.

Also, the 3-dimensional face data restoring and collating system may further include a re-restoration instructing unit configured to monitor a number of the 3-dimensional measured face shape data stored in the 3-dimensional face measured shape storage unit and a number of the 3-dimensional restored face shape data stored in the 3-dimensional face restored shape storage unit, and to instruct the 3-dimensional face shape restoring unit to perform the restoring operation to the 2-dimensional face image once again, if the number of the 3-dimensional face measured shape data when the 3-dimensional restored face shape data is obtained is smaller than the current number of the 3-dimensional face measured shape data.

In another aspect of the present invention, a method of restoring a 3-dimensional face shape data, is achieved by reading out one of a plurality of 2-dimensional face images for a target one of the persons from a 2-dimension face image storage unit; by restoring a 3-dimensional face shape data from the 2-dimensional face image based on a 3-dimensional reference face shape data; and by storing the 3-dimensional restored face shape data in a 3-dimensional face restored shape storage unit.

Here, the method may be achieved by further measuring face shape to produce a 3-dimensional measured face shape data as the 3-dimensional reference face shape data; storing the 3-dimensional measured face shape data in a 3-dimensional face measured shape storage unit; and reading the 3-dimensional measured face shape data corresponding to the 2-dimensional face image from the 3-dimensional face measured shape storage unit in case of the restoration of the 3-dimensional restored face shape data.

Also, the method may be achieved by further storing the 3-dimensional face shape initial data in a 3-dimensional face shape initial data storage unit; and reading the 3-dimensional face shape initial data from the 3-dimensional face shape initial data storage unit in case of the restoration of the 3-dimensional restored face shape data.

Also, the method may be achieved by further monitoring whether the 3-dimensional restored face shape data and 3-dimensional measured face shape data of an identical person are stored in both of the 3-dimensional face restored shape storage unit and the 3-dimensional face measured shape storage unit; and deleting the 3-dimensional restored face shape data from the 3-dimensional face restored shape storage unit when the 3-dimensional restored face shape data and 3-dimensional measured face shape data of an identical person are stored in both of the 3-dimensional face restored shape storage unit and the 3-dimensional face measured shape storage unit.

Also, the method may be achieved by further storing attribute data of the target person in the 2-dimensional face image storage unit and the 3-dimensional face measured shape storage unit for the 2-dimensional face image and the 3-dimensional measured face shape data, respectively; and selecting the 3-dimensional face measured shape data having the attribute data close to the attribute data corresponding to the 2-dimensional face image from the 3-dimensional face measured shape storage unit, when the 3-dimensional face shape restoring unit restores the 3-dimensional face shape data from the 2-dimensional face image.

Also, the method may be achieved by further monitoring a number of the 3-dimensional measured face shape data stored in the 3-dimensional face measured shape storage unit and a number of the 3-dimensional restored face shape data stored in the 3-dimensional face restored shape storage unit; and generating an instruction to perform the restoring operation to the 2-dimensional face image once again, if the number of the 3-dimensional face measured shape data when the 3-dimensional restored face shape data is obtained is smaller than the current number of the 3-dimensional face measured shape data.

In a still another aspect of the present invention, a computer-readable software product for realizing a method of restoring a 3-dimensional face shape data, the method is achieved by reading out one of a plurality of 2-dimensional face images for a target one of the persons from a 2-dimension face image storage unit; by restoring a 3-dimensional face shape data from the 2-dimensional face image based on a 3-dimensional reference face shape data; and by storing the 3-dimensional restored face shape data in a 3-dimensional face restored shape storage unit.

In the computer-readable software product, the method may be achieved by further measuring face shape to produce a 3-dimensional measured face shape data as the 3-dimensional reference face shape data; storing the 3-dimensional measured face shape data in a 3-dimensional face measured shape storage unit; and reading the 3-dimensional measured face shape data corresponding to the 2-dimensional face image from the 3-dimensional face measured shape storage unit in case of the restoration of the 3-dimensional restored face shape data.

In the computer-readable software product, the method may be achieved by further storing the 3-dimensional face shape initial data in a 3-dimensional face shape initial data storage unit; and reading the 3-dimensional face shape initial data from the 3-dimensional face shape initial data storage unit in case of the restoration of the 3-dimensional restored face shape data.

Also, in the computer-readable software product, the method may be achieved by further monitoring whether the 3-dimensional restored face shape data and 3-dimensional measured face shape data of an identical person are stored in both of the 3-dimensional face restored shape storage unit and the 3-dimensional face measured shape storage unit; and deleting the 3-dimensional restored face shape data from the 3-dimensional face restored shape storage unit when the 3-dimensional restored face shape data and 3-dimensional measured face shape data of an identical person are stored in both of the 3-dimensional face restored shape storage unit and the 3-dimensional face measured shape storage unit.

Also, in the computer-readable software product, the method may be achieved by further storing attribute data of the target person in the 2-dimensional face image storage unit and the 3-dimensional face measured shape storage unit for the 2-dimensional face image and the 3-dimensional measured face shape data, respectively; and selecting the 3-dimensional face measured shape data having the attribute data close to the attribute data corresponding to the 2-dimensional face image from the 3-dimensional face measured shape storage unit, when the 3-dimensional face shape restoring unit restores the 3-dimensional face shape data from the 2-dimensional face image.

Also, in the computer-readable software product, the method may be achieved by further monitoring a number of the 3-dimensional measured face shape data stored in the 3-dimensional face measured shape storage unit and a number of the 3-dimensional restored face shape data stored in the 3-dimensional face restored shape storage unit; and generating an instruction to perform the restoring operation to the 2-dimensional face image once again, if the number of the 3-dimensional face measured shape data when the 3-dimensional restored face shape data is obtained is smaller than the current number of the 3-dimensional face measured shape data.

The present invention has the structure and functions in the manner described above. Thus, when creating the 3-dimensional face restored shape data from the 2-dimensional face image data, restoration is performed by referring to the 3-dimensional face measured shape data that are not susceptible to the secular changes over the years from the time of registration even if there is a difference in the facing direction, the lighting and the expression from those at the time of the registration. Therefore, it becomes possible to provide excellent 3-dimensional face registering, restoring and collating system and method, which are capable of restoring the 3-dimensional face restored shape data with a high accuracy in a short time, which cannot be achieved conventionally.

BRIEF DESCRIPTION OF THE DRAWINGS

FIGS. 8A to 8D are flow charts showing operations of the 3-dimensional face data registering, recovering and collating system according to the fourth embodiment according to the present invention;

FIG. 9 is a block diagram showing the configuration of the 3-dimensional face data registering, recovering and collating system according to a fifth embodiment according to the present invention;

FIGS. 10A to 10D are flow charts showing operations of the 3-dimensional face data registering, recovering and collating system according to the fifth embodiment according to the present invention.

DESCRIPTION OF THE PREFERRED EMBODIMENTS

Figure 1:
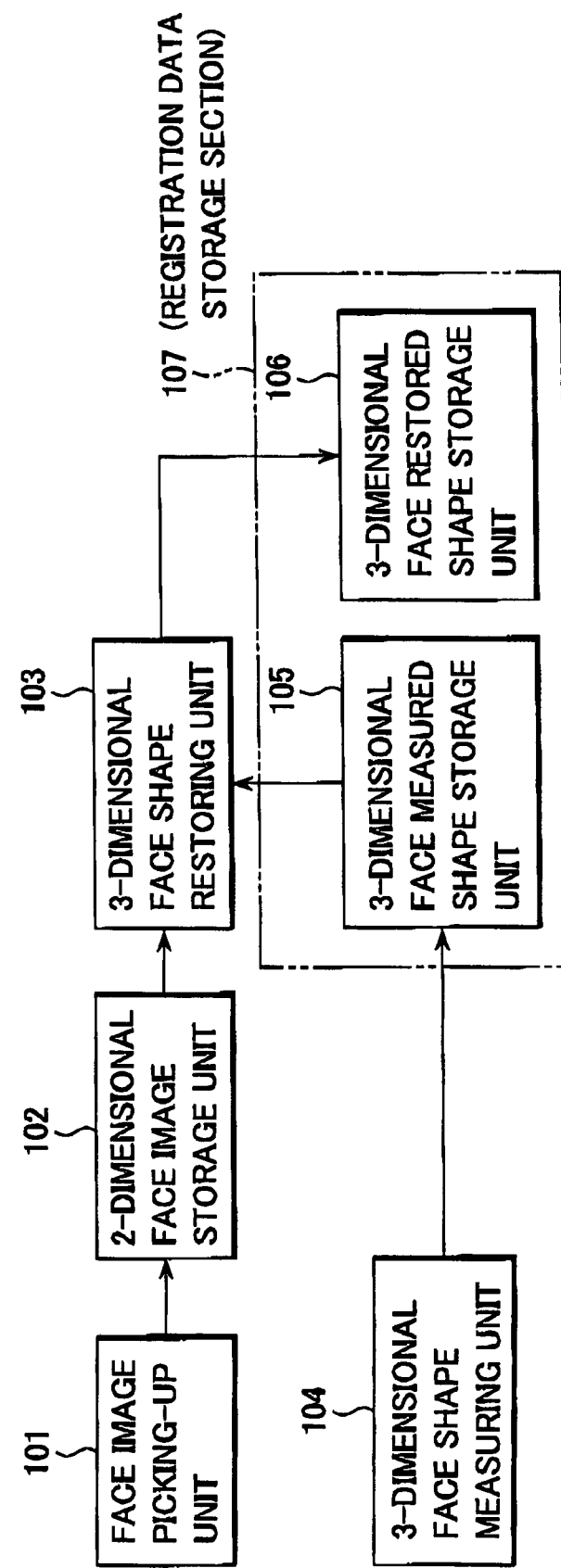
FIG. 1 is a block diagram showing the configuration of a 3-dimensional face data registering, recovering and collating system according to a first embodiment according to the present invention.

Hereinafter, the 3-dimensional face registering, restoring and collating system and method of the present invention will be described with reference to the attached drawings.

First Embodiment

FIG. 1 and FIGS. 2A to 2C show the 3-dimensional face registering, restoring and collating system according to the first embodiment of the present invention. The 3-dimensional face registering, restoring and collating system in the first embodiment includes a 2-dimensional face image storage unit 102 for storing a plurality of face pictures images that are picked-up in advance for individual authentication; a 3-dimensional face shape restoring unit 103 for restoring 3-dimensional face shape data from the stored 2-dimensional face picture images; and a 3-dimensional face restored shape storage unit 106 for storing the restored 3-dimensional face shape data as the registration data. The plurality of face picture images mentioned above are picked-up in advance by a face image picking-up unit 101 for individual authentication.

A 3-dimensional face shape measuring unit 104 for measuring the shape of the face 3-dimensionally, and a 3-dimensional face measured shape storage unit 105 for storing the 3-dimensional face measured shape data measured by the 3-dimensional face shape measuring unit 104 are provided for the aforementioned 3-dimensional face shape restoring unit 103. The aforementioned 3-dimensional face shape restoring unit 103 refers to the 3-dimensional face measured shape data that is acquired by the 3-dimensional face shape measuring unit 104 when restoring the 3-dimensional face shape data from the 2-dimensional face picture image and restores a face shape based on the 3-dimensional face measured shape data. Further, the 3-dimensional face restored shape storage unit 106 and the 3-dimensional face measured shape storage unit 105 constitutes a registration data storage unit 107 that functions in a collating process at the time of individual authentication.

Now, operations of the 3-dimensional face registering, restoring and collating system in the first embodiment will be described.

First, the face image picking-up unit 101 is an ordinal still camera, and a face of a person is picked up by this unit 101. Further, the face image picking-up unit 101 may have a function of performing a reading operation of the picked-up face picture by a scanner to produce a picked-up face image.

The 2-dimensional face image storage unit 102 has a function of storing the face images that have been picked-up by the face image picking-up unit 101. The 3-dimensional face shape restoring unit 103 has a function of restoring a 3-dimensional face shape data by referring to the 3-dimensional face measured shape storage unit 105 based on the face images stored in the 2-dimensional face image storage unit 102.

Furthermore, the 3-dimensional face shape measuring unit 104 has a function of measuring the surface shape of the face stereoscopically/3-dimensionally with laser beams or by a stereo picking-up apparatus. Further, the 3-dimensional face measured shape storage unit 105 has a function of storing the 3-dimensional face shape data that has been measured by the 3-dimensional face shape measuring unit 104. At the same time, the 3-dimensional face restored shape storage unit 106 has a function of storing the 3-dimensional face shape data that have been restored by the 3-dimensional face shape restoring unit 103.

As described, the registration data storage unit 107 includes the 3-dimensional face measured shape storage unit 105 for storing actually measured face shapes and the 3-dimensional face restored shape storage unit 106 for storing the restored face shapes, and functions as the storage unit which is referred in the collating process.

Next, the entire operation of the present embodiment will be described by referring to the flowcharts shown in FIGS. 2A to 2C.

Figure 2A:
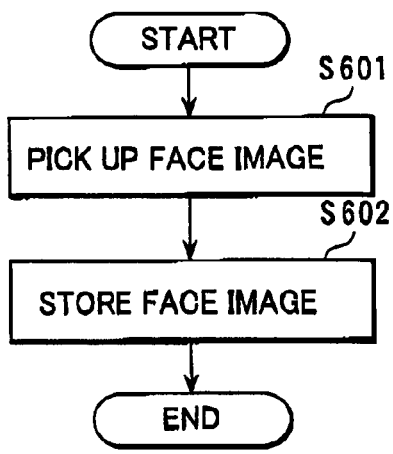
FIGS. 2A to 2C are flow charts showing operations of the 3-dimensional face data registering, recovering and collating system according to the first embodiment according to the present invention.
Figure 2B:
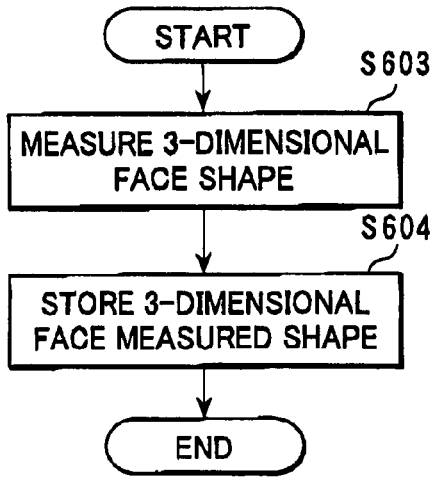

First, referring to FIG. 2A, a face picture image is picked-up by the face image picking-up unit 101 (S601), and the face image is stored in the 2-dimensional face image storage unit 102 (S602). Referring to FIG. 2B, the 3-dimensional face shape data is measured by the 3-dimensional face shape measuring unit 104 (S603), and the 3-dimensional face measured shape data is stored in the 3-dimensional face measured shape storage unit 105 (S604).

Figure 2C:
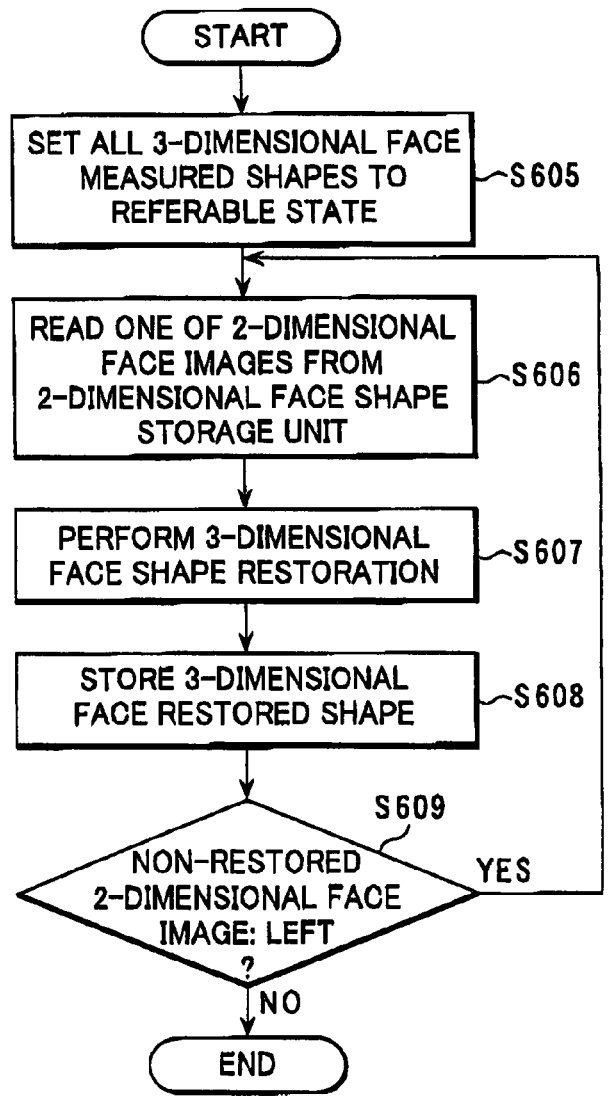

Furthermore, referring to FIG. 2C, first, all the data stored in the 3-dimensional face measured shape storage unit 105 are set to a referable state (S605). Thereafter, one of the 2-dimensional face images is read out from the 2-dimensional face shape storage unit 102 (S606), and a 3-dimensional face shape data is restored by the 3-dimensional face shape restoring unit 103 to match the face image based on all of the 3-dimensional face measured shape data set to the referable state at the step S605 (S607). Then, the 3-dimensional face restored shape data is stored in the 3-dimensional face restored shape storage unit 106 (S608). Furthermore, this operation is continued until there is no more face image remained to be the target of restoration (S609).

Each of the operations of storing the 2-dimensional face image, of storing the 3-dimensional face measured shape data, of restoring the 3-dimensional face shape data, and of storing the 3-dimensional face restored shape data described above may be constituted as a programs or a portion thereof to be executed by a computer. As described above, according to the first embodiment, restoration is performed by referring to the 3-dimensional face measured shape data that are not susceptible to secular change from the time of registration even if there are differences in a facing orientation, a lighting or an expression from them at the time of the registration, when the 3-dimensional Race restored shape data is generated from the 2-dimensional face image data. Therefore, the 3-dimensional face restored shape data can be generated with the high accuracy in a short time, and a highly reliable 3-dimensional face restored shape data can be obtained. Further, in the first embodiment, the 3-dimensional face shape measuring process and the 3-dimensional face shape restoring process are separated as in FIGS. 2B and 2C, so that each flow can be executed in parallel. Therefore, in the present embodiment, the accuracy of the 3-dimensional face shape data restored every day can be improved since 3-dimensional face measured shape data are additionally stored every data.

Second Embodiment

Next, the 3-dimensional face registering, restoring and collating system according to the second embodiment of the present invention will be described with reference to FIG. 3 and FIGS. 4A to 4C. It should be noted that the same reference numerals as those of the above-described first embodiment shown in FIG. 1 are assigned to the same components.

Figure 3:
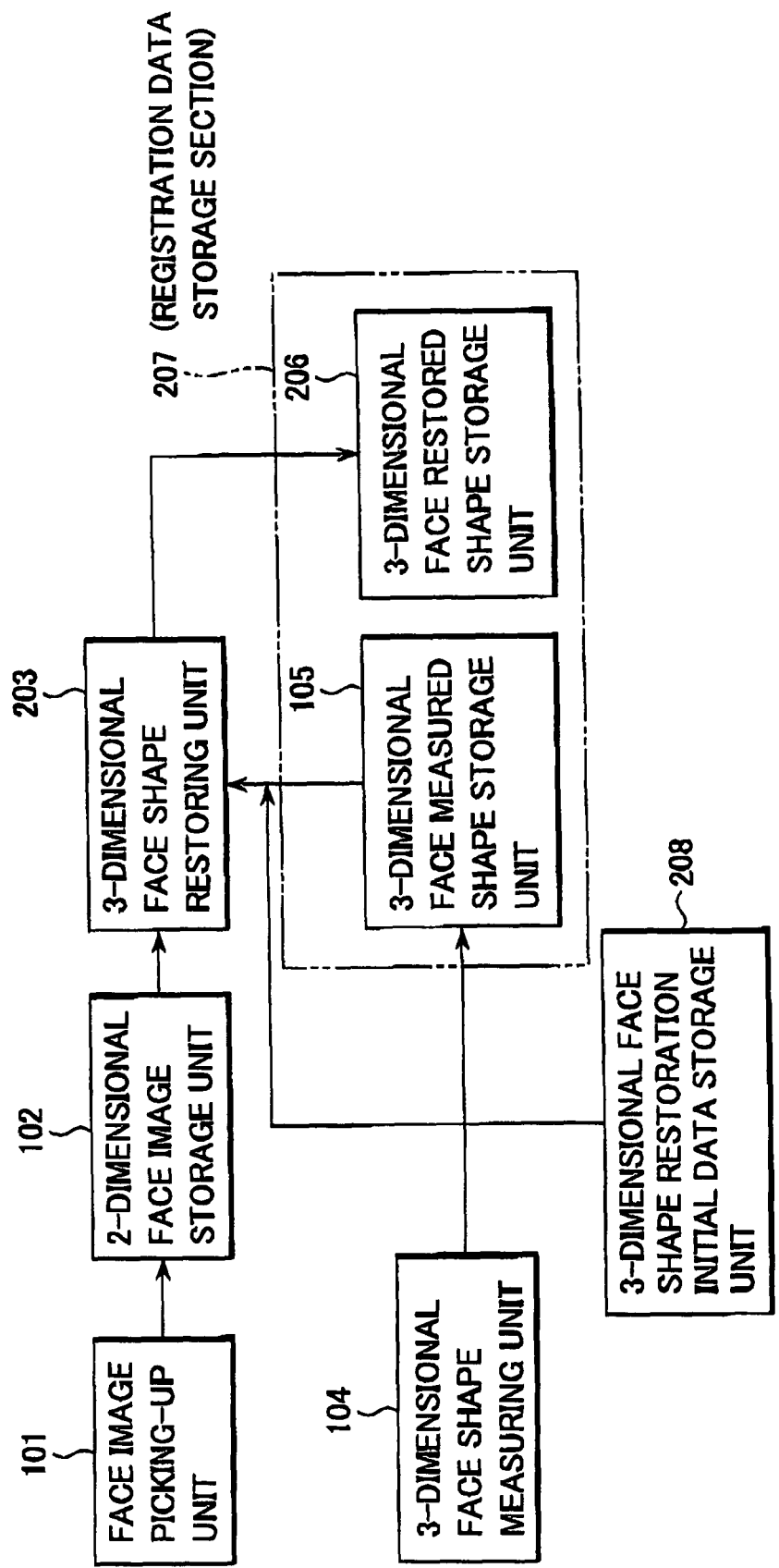
FIG. 3 is a block diagram showing the configuration of the 3-dimensional face data registering, recovering and collating system according to a second embodiment according to the present invention.

Referring to FIG. 3, the second embodiment includes the face image picking-up unit 101, the 2-dimensional face image storage unit 102, a 3-dimensional face shape restoring unit 203, the 3-dimensional face shape measuring unit 104, a registration data storage unit 207, and a 3-dimensional face shape restoration initial data storage unit 208. The registration data storage unit 207 is composed of the aforementioned 3-dimensional face measured shape storage unit 105 and a 3-dimensional face restored shape storage unit 206.

The aforementioned 3-dimensional face shape restoring unit 203 has a function of restoring a 3-dimensional face shape data from a face image stored in the 2-dimensional face image storage unit 102 based on the 3-dimensional face measured shape data stored in the 3-dimensional face measured shape storage unit 105 or the 3-dimensional face shape restoration initial data stored in the 3-dimensional face shape restoration initial data storage unit 208.

The 3-dimensional face restored shape storage unit 206 has a function of storing the 3-dimensional face shape data that are restored by the 3-dimensional face shape restoring unit 203.

As in the above-described case of FIG. 1, the registration data storage unit 207 includes the 3-dimensional face measured shape storage unit 105 for storing the actually measured 3-dimensional face measured shape data and the 3-dimensional face restored shape storage unit 206 for storing the restored face shape, and functions as the storage unit which is referred in the collating process.

The 3-dimensional face shape restoration initial data storage unit 208 is constituted to have the 3-dimensional face measured shape data measured by other system stored therein in advance. Other components are the same as those of the first embodiment described above.

Next, the entire operation of the 3-dimensional face registering, restoring and collating system in the second embodiment will be described with reference to flowcharts shown in FIGS. 4A to 4C.

Figure 4A:
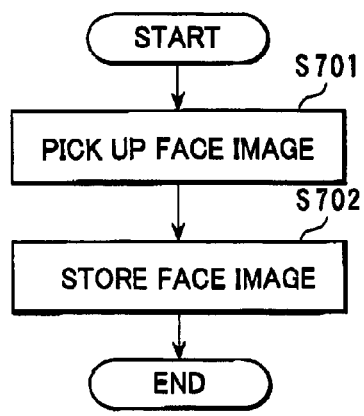
FIGS. 4A to 4C are flow charts showing operations of the 3-dimensional face data registering, recovering and collating system according to the second embodiment according to the present invention.
Figure 4B:
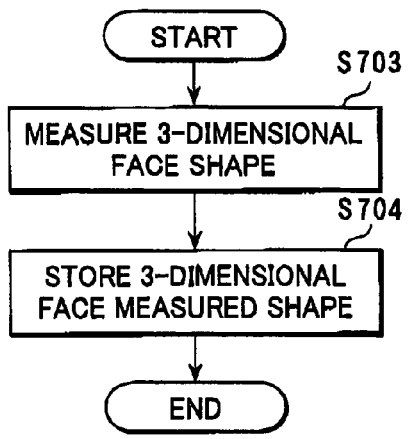

First, referring to FIG. 4A, a face image is picked-up by the face image picking-up unit 101 (S701). Then, the face image is stored in the 2-dimensional face image storage unit 102 (S702). Referring to FIG. 4B, the 3-dimensional face shape is measured by the 3-dimensional face shape measuring unit 104 (S703), and the 3-dimensional face measured shape data is stored in the 3-dimensional face measured shape storage unit 105 (S704).

Figure 4C:
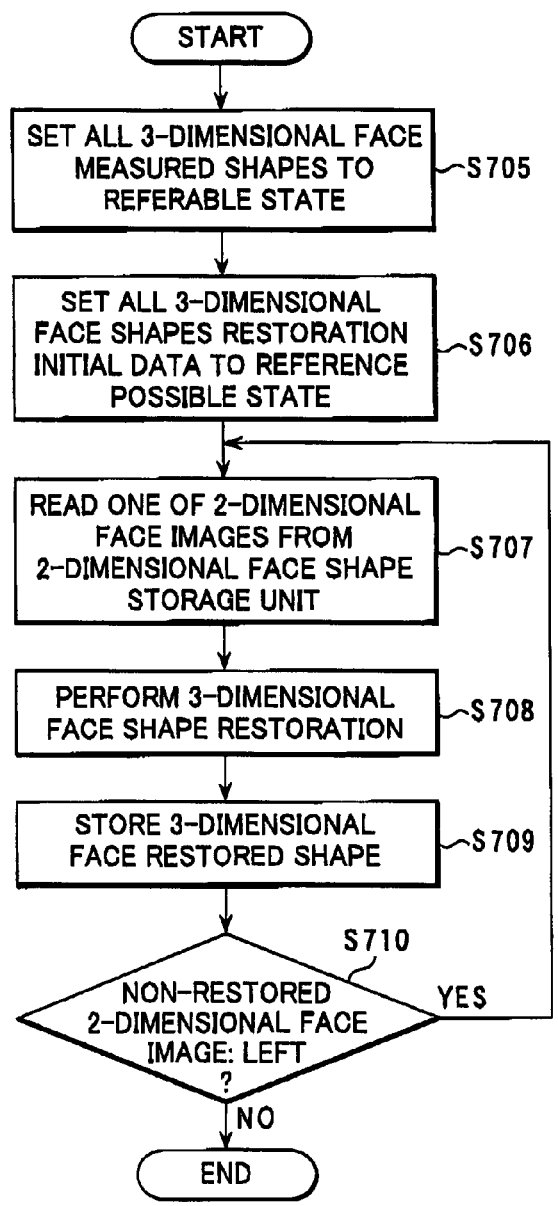

Furthermore, referring to FIG. 4C, first, all the data that are stored in the 3-dimensional face measured shape storage unit 105 are set to be a referable or accessible state (S705). Subsequently, all the 3-dimensional face measured shape data that are stored in the 3-dimensional face restoration initial data storage unit 208 are set to the referable state (S706). Thereafter, one of the 2-dimensional face images is read out from the 2-dimensional face shape storage unit 102 (3707), and a 3-dimensional face shape data is restored to match the face image based on all of the 3-dimensional face measured shape data that are set to be referable at the step S705 and sep S706 (S708). Subsequently, the restored 3-dimensional face shape data is stored in the 3-dimensional face shape storage unit 206 (S709). This operation is continued until there is no more face image remained to be the target of restoration (S710).

Moreover, for the 3-dimensional face measured shape data to be referred, the 3-dimensional face shape restoring unit 203 first extracts and refers to the stored data of the 3-dimensional face measured shape storage unit 105. The 3-dimensional face shape restoring unit 203 uses the stored data of the above-described 3-dimensional face shape restoration initial data storage unit 208, when there is no data stored in the 3-dimensional face measured shape storage unit 105.

The selecting/referring function of the 3-dimensional face measured shape data performed by the 3-dimensional face shape restoring unit 203 in the 3-dimensional face shape restoring process may be accomplished based on a program to be executed by a computer.

As described above, the second embodiment is formed to use the 3-dimensional face measured shape data stored in advance in the 3-dimensional face shape restoration initial data storage unit 208. Thus, the 3-dimensional face shape restoring unit 203 can function effectively by the use of the 3-dimensional face shape restoration initial data storage unit 208, even when it is right after the introduction of the system, etc., so that the 3-dimensional face measured shape data is not sufficiently stored in the 3-dimensional face measured shape storage unit 205 or there is no stored 3-dimensional face measured shape data at all. Other function and effects are the same as those of the first embodiment.

Third Embodiment

Next, the 3-dimensional face registering, restoring and collating system according to the third embodiment of the present invention will be described with reference to FIG. 5 and FIGS. 6A to 6D. It should be noted that the same reference numerals as those of the above-described first embodiment shown in FIG. 1 are assigned to the same components.

Figure 5:
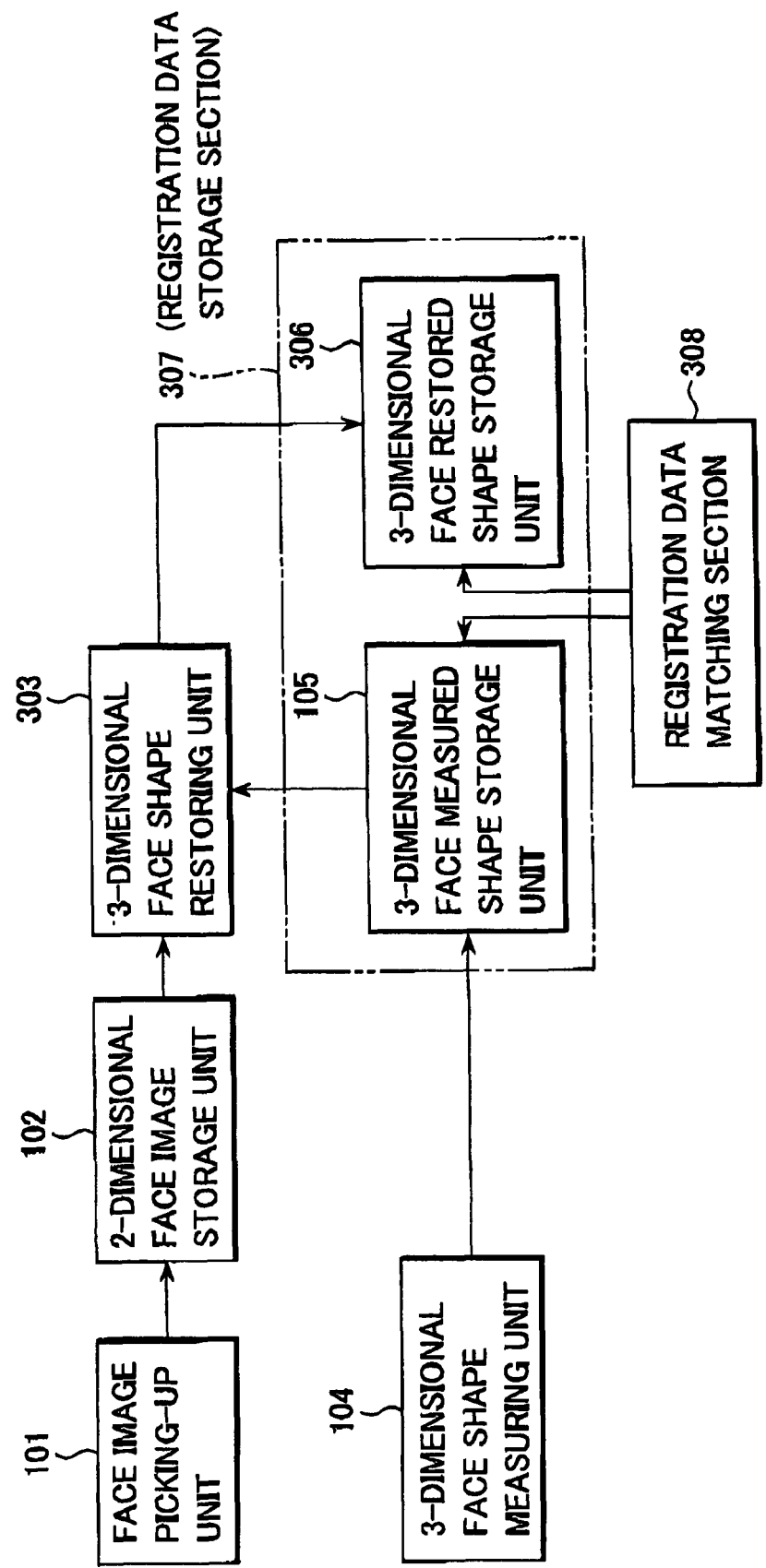
FIG. 5 is a block diagram showing the configuration of the 3-dimensional face data registering, recovering and collating system according to a third embodiment according to the present invention.

Referring to FIG. 5, the third embodiment includes the face image picking-up unit 101, the 2-dimensional face image storage unit 102, a 3-dimensional face shape restoring unit 303, the 3-dimensional face shape measuring unit 104, a 3-dimensional face restored shape storage unit 306, and a registration data storage unit 307. Among those, the 3-dimensional face shape restoring unit 303 and the 3-dimensional face restored shape storage unit 306 respectively have the same functions as those of the 3-dimensional face shape restoring unit 103 and the 3-dimensional face restored shape storage unit 107 of the above-described first embodiment (see FIG. 1 and FIGS. 2A to 2C).

The 3-dimensional face restored shape storage unit 306 and the 3-dimensional face measured shape storage unit 105 is provided with a registration data matching unit.308 that has a function of monitoring whether the data of a same person is doubly stored therein. This registration data matching unit 308 has a restored shape data deleting control function of deleting the restored face shape data when the measured face shape overlaps with the restored face shape data. Further, the registration data storage unit 307 includes the 3-dimensional face measured shape storage unit 105 and the 3-dimensional face restored shape storage unit 306.

Each of the above-described components performs the operation and has the functions described below.

First, the 3-dimensional face shape restoring unit 303 restores 3-dimensional face shape data from the face images stored in the 2-dimensional face image storage unit 102 based on the 3-dimensional face measured shape data stored in the 3-dimensional face measured shape storage unit 105. The 3-dimensional face restored shape storage unit 306 stores the 3-dimensional face restored shape data that has been restored by the 3-dimensional face shape restoring unit 303. As described above, the registration data storage unit 307 includes the 3-dimensional face measured shape storage unit 105 for storing the face shape data actually measured and the 3-dimensional face restored shape storage unit 306 for storing face shape data restored, and functions as a storage unit which is referred in the collating process.

The registration data matching unit 308 has a function of monitoring whether the data of the same person is doubly stored in both of the 3-dimensional face measured shape storage unit 105 and the 3-dimensional face restored shape storage unit 306. When the data is doubly stored therein, the restored shape data deleting control function operates to save preferentially the measured face shape data of the 3-dimensional face measured shape storage unit 105 that can provide a highly accurate shape, and deletes the restored face shape data of the 3-dimensional face restored shape storage unit 306. Other components are the same as those of the above-described first embodiment (see FIG. 1 and FIGS. 2A to 2C).

Next, the entire operation of the 3-dimensional face registering, restoring and collating system in the third embodiment will be described with reference to flowcharts shown in FIGS. 6A to 6D.

Figure 6:
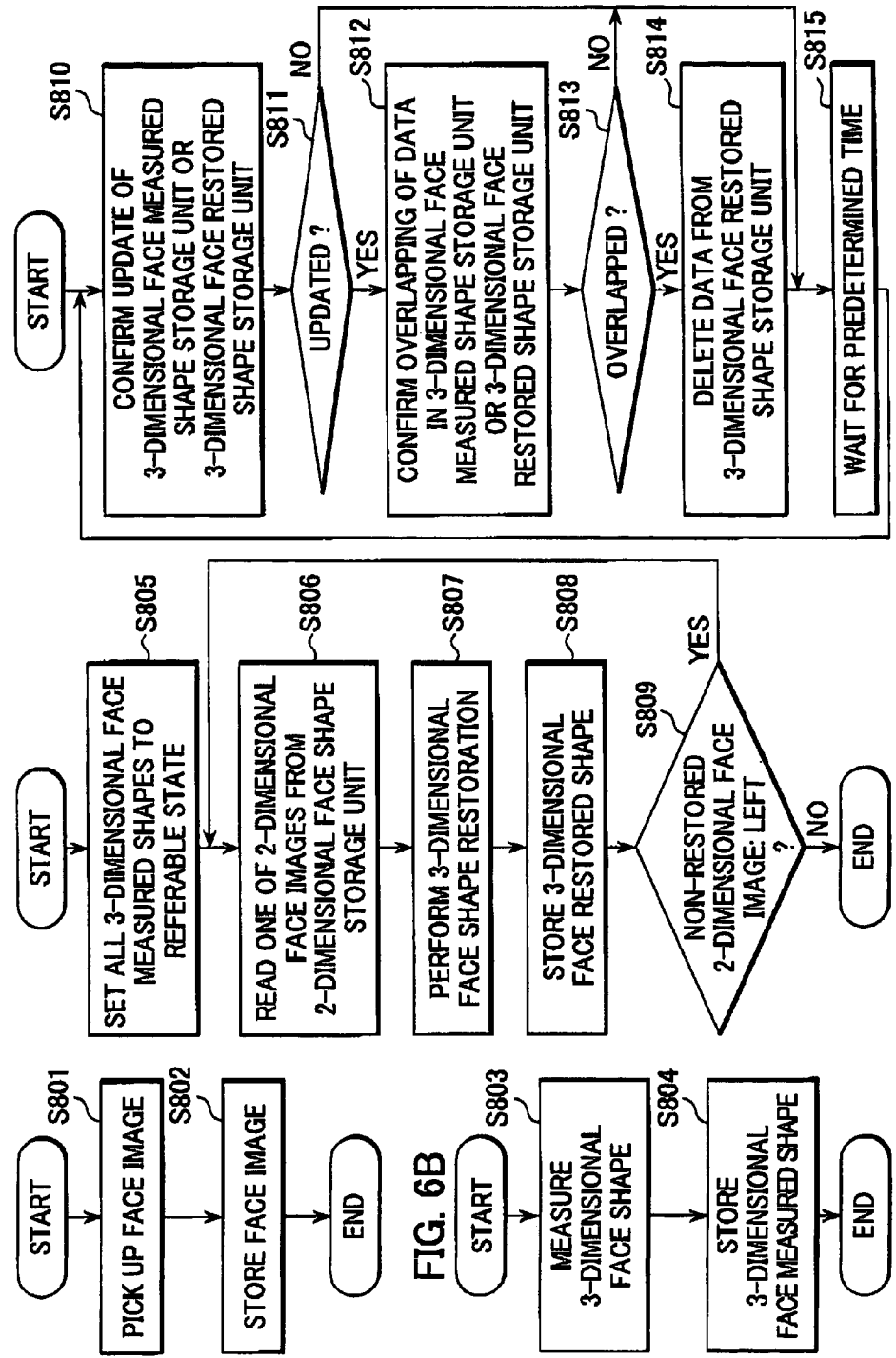
FIGS. 6A to 6D are flow charts showing operations of the 3-dimensional face data registering, recovering and collating system according to the third embodiment according to the present invention.

First, referring to FIG. 6A, a face image is picked-up by the face image picking-up unit 101 (S801), and the face image is stored in the 2-dimensional face image storage unit 102 (S802). Referring to FIG. 6B, the 3-dimensional face shape data is measured (S803), and the 3-dimensional face shape data is stored in the 3-dimensional face measured shape storage unit 105 (S804). Furthermore, referring to FIG. 6C, first, all the 3-dimensional face measured shape data stored in the 3-dimensional face measured shape storage unit 105 are set to be referable (S805). Thereafter, one of the 2-dimensional face images is read out from the 2-dimensional face shape storage unit 102 (S806), and the 3-dimensional face shape data is restored to match the face image based on all of the 3-dimensional face measured shape data that are set to be referable at a step S805 (S807). Then, the restored 3-dimensional face shape data is stored in the 3-dimensional face restored shape storage unit 306 (S808). This operation is continued until there is no more face image remained to be the target of restoration (S809).

Referring to FIG. 6D, the aforementioned registration data matching unit 308 first functions to check whether or not the data stored in the 3-dimensional face measured shape storage unit 105 and the 3-dimensional face restored shape storage unit 306 have been updated (S810). When the data have not been updated (S811), the registration data matching unit 308 stands by for a certain time (S815). When the data have been updated (S811), the registration data matching unit 308 checks whether or not the face image of a same person is registered in the 3-dimensional face measured shape storage unit 105 and the 3-dimensional face restored shape storage unit 306 (S812) When the face image of the same person is not registered therein (S813), the registration data matching unit 308 stands by for a certain time (S815). When the face image of the same person has been registered (S813), the data of the 3-dimensional face restored shape storage unit 306 is deleted (S814), and then stands by (S815).

For the restored shape data deleting control function of the registration data matching unit 308 performed at the restored shape data deleting control step mentioned above, the execution contents may be defined based on a program to be executed by a computer.

As described above, the third embodiment can provide the same effects as those of the above-described first embodiment (FIG. 1 and FIGS. 2A to 2C). In addition, this embodiment is configured in such a manner that the registration data matching unit 308 is connected to both of the 3-dimensional face measured shape storage unit 105 and the 3-dimensional face restored shape storage unit 306. Therefore, the face image of the same person is not doubly stored in both the 3-dimensional face restored shape storage unit 306 and the 3-dimensional face measured shape storage unit 105. Further, if there is the doubly stored data, the data of the 3-dimensional face measured shape storage unit 105 that provides a high measurement accuracy is selected properly to continue storing the data. Thus, the restoration accuracy can e improved.

Fourth Embodiment

Next, the 3-dimensional face registering, restoring and collating system according to the fourth embodiment of the present invention will be described by referring to FIG. 7 and FIGS. 8A to 8C. It should be noted that the same reference numerals as those of the above-described first embodiment shown in FIG. 1 are assigned to the same components.

The fourth embodiment is distinctive in the following respects. In the fourth embodiment, attribute data such as age and sexuality of the a target person is added to the measured face shape data that has been measured by the 3-dimensional face shape measuring unit 104 in the first embodiment described above, and one of a large amount of measured data that is close to the attribute data is extracted in the individual authentication. Thus, it is possible to speed up the operation process for restoring a face image.

Figure 7:
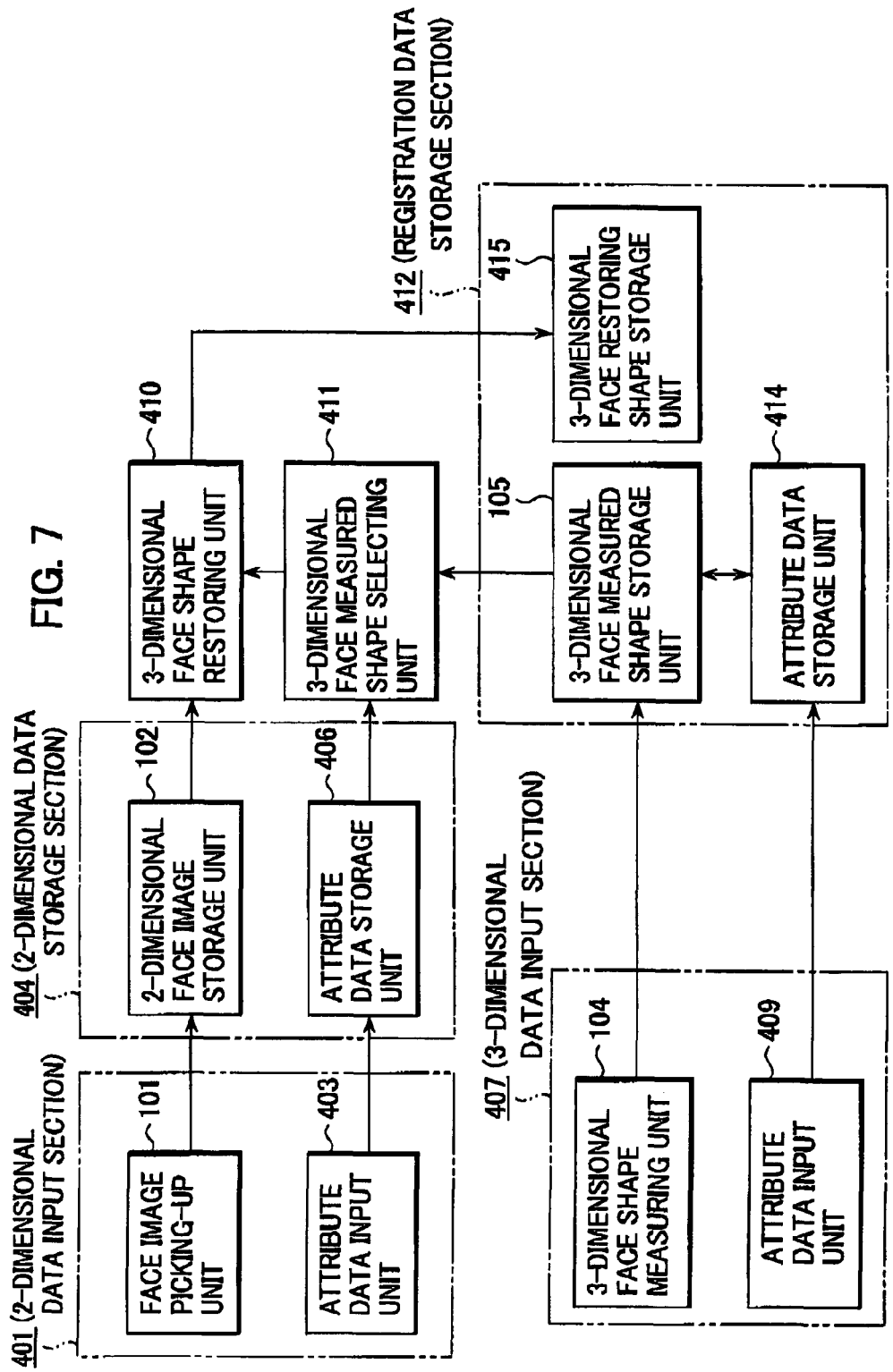
FIG. 7 is a block diagram showing the configuration of the 3-dimensional face data registering, recovering and collating system according to a fourth embodiment according to the present invention.

Referring to FIG. 7, the fourth embodiment includes a 2-dimensional face data input section 401, a 2-dimensional face data storage section 404, a 3-dimensional face shape restoring unit 410, a 3-dimensional face measured shape selecting unit 411, a 3-dimensional face data input section 407, and a registration data storage section 412. Among them, the 2-dimensional face data input section 401 includes the face image picking-up unit 101 and an attribute data input unit 403. The 2-dimensional face data storage section 404 includes the 2-dimensional face image storage unit 102 and an attribute data storage unit 406. The 3-dimensional face data input section 407 includes the 3-dimensional face shape measuring unit 104 and an attribute data input unit 409. The registration data storage section 412 includes the 3-dimensional face measured shape storage unit 105, an attribute data storage unit 414, and a 3-dimensional face restored shape storage unit 415.

Specifically, each of the 2-dimensional face image storage unit 102 and the 3-dimensional face measured shape storage unit 105 is also provided with the attribute data storage unit 406 or 414 to which sexuality, age and the like of the person having the face image or the measured face to be stored in the storage units 102 and 105 are related to the stored data and stored therein.

The 3-dimensional measured data selecting unit 411 is provided along with the aforementioned 3-dimensional face shape restoring unit 410. The 3-dimensional measured data selecting unit 411 has a function of selectively extracting the 3-dimensional face measured shape data whose attribute data is close to the attribute data of the 2-dimensional face image, and supplying it to the 3-dimensional face shape restoring unit 410, when the 3-dimensional face shape restoring unit 410 restores the 3-dimensional face shape data from the 2-dimensional face image.

Further, the attribute data input unit 403 of the 2-dimensional face data input section 401 has a function of inputting the attributes that affect the face image, such as sexuality and age of the face picked-up by the face image picking-up unit 102. Furthermore, the attribute data storage unit 406 of the 2-dimensional face data storage section 404 has a function of storing the attributes of the 2-dimensional face data inputted from the attribute data input unit 403. The inputted attributes are related to the face images stored in the-2-dimensional face image storage unit 102. The attribute data input unit 409 of the 3-dimensional face data input section 407 has a function of specifying and inputting the attributes that affect the face image, such as sexuality and age of the face measured by the 3-dimensional face shape measuring unit 104. Further, the attribute data storage unit 414 of the registration data storage section 412 stores the attributes inputted from the attribute data input unit 409. The inputted attributes are related to the 3-dimensional restored face shape data that have been stored in the 3-dimensional face measured shape storage unit 105.

The 3-dimensional face restored shape storage unit 415 stores the 3-dimensional face shape data that have been restored by the 3-dimensional face shape restoring unit 410. Other components are the same as those of the above-described first embodiment (FIGS. 1 and FIGS. 2A to 2C).

Next, the entire operation of the 3-dimensional face registering, restoring and collating system according to the fourth embodiment will be described with reference to flowcharts shown in FIGS. 8A to 8C.

First, referring to FIG. 8A, a face image is picked-up (S901), and the attributes of the face image are inputted to the attribute data storage unit 406 from the attribute data input unit 403 (S902). Then, the face image picked-up at the step S901 is stored in the 2-dimensional face image storage unit 102 (S903) and at the same time the face image is related to the attributes to be stored in the 2-dimensional face image storage unit 102 (S904).

Further, referring to FIG. 8B, the 3-dimensional face shape data is measured by the 3-dimensional face shape measuring unit 104 (S905), and the attributes of the measured 3-dimensional face shape data are inputted from the attribute data input unit 409 (S906). Thereafter, the 3-dimensional face shape data measured at a step S905 is stored in the 3-dimensional face measured shape storage unit 105 (S907) and at the same time the face image is related to the attributes to be stored in the 3-dimensional face measured shape storage unit 105 (S908).

Moreover, referring to FIG. 8C, first, one of the 2-dimensional face images is read out by the 2-dimensional face shape storage unit 102 (S909) and at the same time, the attribute data related to the acquired face image is read out (S910). Thereafter, the 3-dimensional measured data selecting unit 411 selects and reads the 3-dimensional face measured shape that is in the same classification as that of the attribute data from the 3-dimensional face measured shape storage unit 105 (S911). The 3-dimensional face shape restoring unit 410 performs restoration of the 3-dimensional face shape data to match the face image based on the 3-dimensional face measured shape data (S912). The 3-dimensional restored face shape data is stored in the 3-dimensional face restored shape storage unit 415 (S913). This operation is continued until there is no more face image remained to be the target of restoration (S914). In the operations of storing the attribute data, of relating with the attribute data, of selecting the 3-dimensional face measured data, and of restoring the 3-dimensional face shape may be accomplished based on a program to be executed by a computer.

As described above, the fourth embodiment can provide the same effects as those of the above-described first embodiment (FIG. 1 and FIGS. 2A to 2C). In addition, the fourth embodiment is configured to include the attribute data input unit 403, the attribute data storage unit 406, the attribute data input unit 409, the attribute data storage unit 414, and the 3-dimensional face measured shape selecting unit 411. Therefore, only the 3-dimensional face measured shape having the similar attributes such as the-sexuality and the age may simply be read or referred by the 3-dimensional face shape restoring unit 410, so that it is not necessary to read or refer to all of the 3-dimensional face measured shape. Thus, the operation process at the time of restoring the 3-dimensional face shape data can be executed more promptly. At the same time, it is possible to reduce the resources (memory, network transmission amount, etc.) necessary for reading the 3-dimensional face shape data.

Fifth Embodiment

Next, the 3-dimensional face registering, restoring and collating system according to the fifth embodiment of the present invention will be described with reference to FIG. 9 and FIGS. 10A to 10D. It should be noted that the same reference numerals as those of the above-described first embodiment shown in FIG. 1 are assigned to the same components.

The fifth embodiment is distinctive in the following respects. The fifth embodiment includes a 3-dimensional face shape restoring unit 503 having a function similar to the 3-dimensional face shape restoring unit 103 in the above-described first embodiment. A re-restoration monitoring/notifying unit 508 is provided for the 3-dimensional face shape restoring unit 503, to compare the number of 3-dimensional face measured shape data used initially at the time of the restoration and the number of the currently existing 3-dimensional face measured shape data. When the latter number is sufficiently larger, the restoration of the 3-dimensional face shape data is performed again by the 3-dimensional face shape restoring unit 503 to improve the accuracy of the 3-dimensional face shape restored data.

This will be described in detail in the followings. Referring to FIG. 9, the fifth embodiment is composed of the face image picking-up unit 101, the 2-dimensional face image storage unit 102, the 3-dimensional face shape restoring unit 503, the 3-dimensional face shape measuring unit 104, a registered data storage section 507, and the re-restoration monitoring/notifying unit 508. The registered data storage section 507 is constituted with the 3-dimensional face measured shape storage unit 105 and the 3-dimensional face restored shape storage unit 506.

In addition to the aforementioned 3-dimensional face shape restoring unit 503, there are provided the above-described re-restoration monitoring/notifying unit 508 which monitors the number of contents that are stored in each of the 3-dimensional face measured shape storage unit 105 and the 3-dimensional face restored shape storage unit 506. The re-restoration monitoring/notifying unit 508 has a re-restoration executing command function for issuing a command to the 3-dimensional face shape restoring unit 503 to restore the shape of the restored face image once again, when the number of the aforementioned 3-dimensional measured face shape data at the time of restoring one of the restored face shapes stored in the 3-dimensional face restored shape storage unit 506 is smaller than the currently number of the stored 3-dimensional measured shapes.

Each of the above-described components performs the operations and has the functions described below.

First, the 2-dimensional face image storage unit 102 stores the face image picked-up by the face image picking-up unit 101. The 3-dimensional face shape restoring unit 503 has a function of restoring the 3-dimensional face shape data for the face image stored in the 2-dimensional face image storage unit 102 based on the shape measured data stored in the 3-dimensional face shape measured storage unit 105. The 3-dimensional face restored shape storage unit 506 stores the 3-dimensional face shape data that are restored by the 3-dimensional face shape restoring unit 503.

As described above, the registration data storage section 50.7 includes the 3-dimensional face measured shape storage unit 105 for storing data actually measured and the restored 3-dimensional face restored shape storage unit 506, and functions as the storage unit which is referred in the collating process.

The above-described re-restoration monitoring/notifying unit 508 has functions of: simultaneously monitoring the 3-dimensional face measured shape storage unit 105 and the 3-dimensional face restored shape storage unit 506; comparing the number of 3-dimensional face measured shapes in the 3-dimensional face measure shape storage unit 105 used at the time of restoring each of the 3-dimensional face restored shapes that are stored in the 3-dimensional face restored shape storage unit 506 and the number of the 3-dimensional face measured shapes currently existing in the 3-dimensional face measured shape storage unit 105; and, when the latter number is sufficiently larger, performing restoration of the 3-dimensional face shape data by the 3-dimensional face shape restoring device means 503. Other components are the same as those of the above-described first embodiment.

Next, the entire operation of the 3-dimensional face registering, restoring and collating system according to the fifth embodiment will be described with reference to flowcharts shown in FIGS. 10A to 10D.

First, referring to FIG. 10A, a face image is picked-up by the face image picking-up unit 101 (S1001), and the face image is stored in the 2-dimensional face image storage unit 102 (S1002). Referring to FIG. 10B, the 3-dimensional face shape data is measured by the 3-dimensional face shape measuring unit 104 (S1003), and the 3-dimensional face measured shape data is stored in the 3-dimensional face measured shape storage unit 105 (S1004) Furthermore, referring to FIG. 10C, first, all the data stored in the 3-dimensional face measured shape storage unit 105 are set to be referable (S1005). Thereafter, one of the 2-dimensional face images is read out from the 2-dimensional face shape storage unit 102 (S1006), and a 3-dimensional face shape data is restored by the 3-dimensional face shape restoring unit 103 to match the face image based on all of the 3-dimensional face measured shape data that are set to be referable at the step S1005 (S1007). Then, the 3-dimensional restored face shape data is stored in the 3-dimensional face restored shape storage unit 106 (S1008). Furthermore, this operation is continued until there is no more face image remained to be the target of restoration (S1009).

Furthermore, referring to FIG. 10D, first, the above-described re-restoration monitoring/notifying unit 508 refers to the number (the number is supposed to be A) of the 3-dimensional face measured shape data stored in the 3-dimensional face measured shape storage unit 105 (S1010). Thereafter, the above-described re-restoration monitoring/notifying unit 508 refers to one of the restored face shape data stored in the 3-dimensional face restored shape storage unit 105, and refers to the number (this number is supposed to be B) of the 3-dimensional face measured shapes present at the time of the restoration (S1011). Then, the above-described re-restoration monitoring/notifying unit 508 compares A with B (S1012). When A is not sufficiently larger than B, the above-described re-restoration monitoring/notifying unit 508 performs the process on the next restored shape (S1011) When A is sufficiently larger than B, the monitoring/notifying unit 508 performs restoration of the 3-dimensional face shape data again (S1013).

Then, the 3-dimensional restored face shape data is overwritten and stored in the 3-dimensional face restored shape storage unit 105 (S1014). When there is a non-referred 3-dimensional face shape data remained, the step S1011 is performed again. If there is none remained, the re-restoration monitoring/notifying unit 508 stands by for a certain time until a 3-dimensional face measured shape is stored (S1016), and starts the process of the step S1010 thereafter. For the re-restoration monitoring/notifying step by the re-restoration monitoring/notifying unit 508 and the 3-dimensional face shape restoring step by the 3-dimensional face shape restoring unit 103 described above, the execution contents of each step may be accomplished based on a program to be executed by a computer.

As described above, the fifth embodiment can provide the same effects as those of the above-described first embodiment (FIG. 1 and FIGS. 2A to 2C). In addition, the fifth embodiment is provided with the re-restoration monitoring/notifying unit 508 to compare the number of the 3-dimensional face measured shapes used at the time of performing the restoration of the 3-dimensional face shape data and the number of the currently existing 3-dimensional face measured shapes. Therefore, the 3-dimensional face restoring shape storage unit 105 can have still higher accuracy through automatically detecting the timing of the re-restoration of the 3-dimensional face shape data and execute the re-restoration.

EXAMPLES

Next, a specific example will be described.

Figure 11:
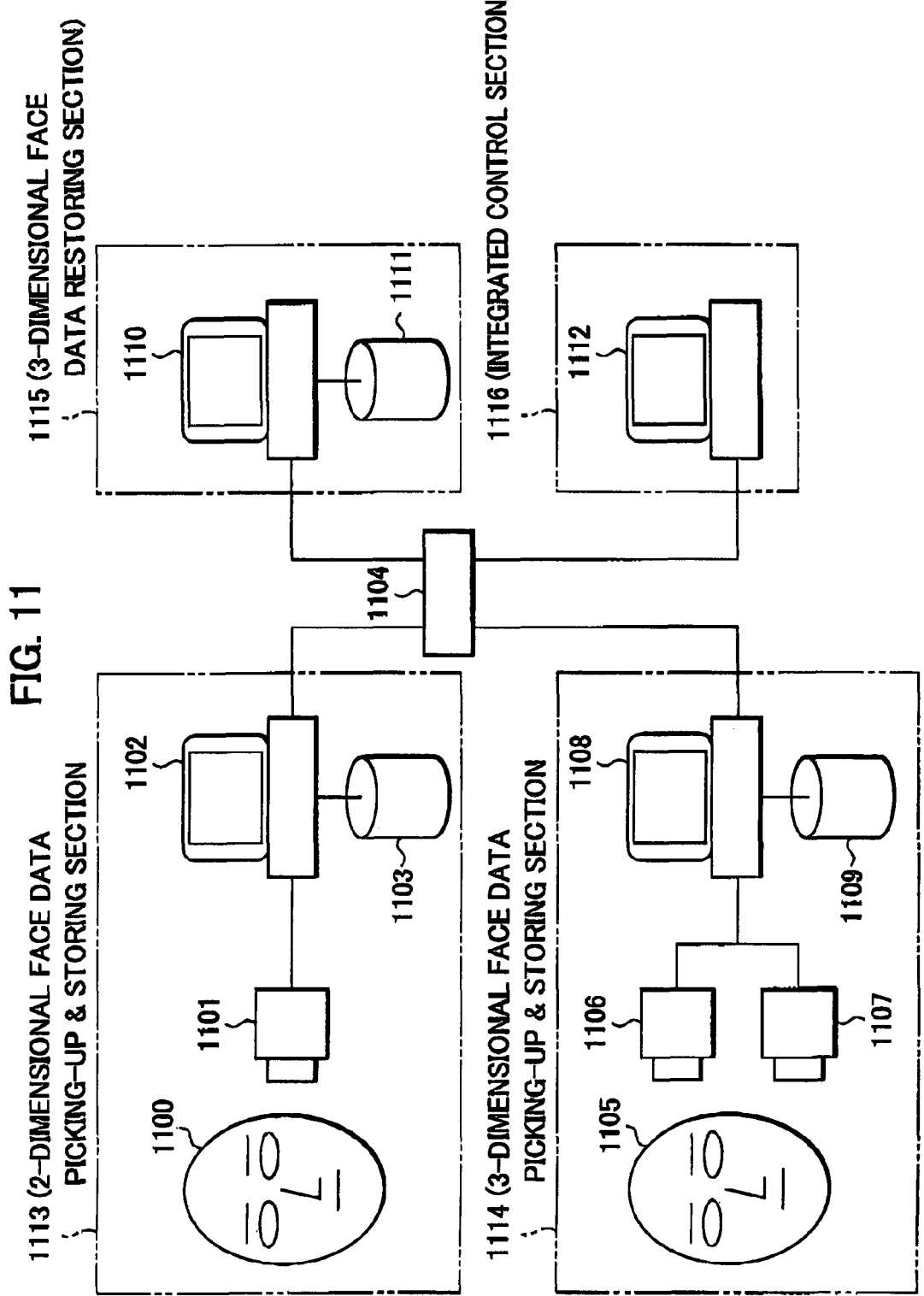
FIG. 11 is a diagram showing a specific example of the present invention.

FIG. 11 shows the example. This example shown in FIG. 11 includes a 2-dimensional face data picking-up/storage section 1113, a 3-dimensional face data picking-up/storage section 1114, a 3-dimensional face data restoring section 1115, and an integrated managing section 1116. Those components are connected to a network through a router 1104. In the 2-dimensional face data picking-up/storage section 1113, the face of a person 1100 is picked-up by a still camera 1101, and the face image is read by a computer 1102 as digital data. Then, the personal data (attribute data) such as a name and a sexuality are inputted to be stored in a database 1103. Further, in the 3-dimensional face data picking-up/storage section 1114, the face of a person 1105 is picked-up y a stereo camera that is composed or two cameras 1106 and 1107, and the face image is stored into a computer 1108. In the computer 1108, the steric shape is derived from the image of the stereo camera, and is stored in a database 1109 along with the personal data (attribute data) such as the name and the sexuality. In the 3-dimensional face data restoring section 1115, the 2-dimensional face data of the restoration target person is read out from the database 1103 by using the computer 1110, and the 3-dimensional face data is read out in order from the database 1109 thereafter. Then, the restoration of a 3-dimensional face shape data is performed based on the 3-dimensional face data.

The restored 3-dimensional face shape data is stored in the database 1111. In the integrated managing section 1116, the computer 1112 always monitors the database 1103 of the 2-dimensional face data and the database 1109 of the 3-dimensional face data via the network to check whether or not the face images of the same person are stored in both of the databases. If the face image of the same person is stored in both of the databases, the deletion of the data from the 2-dimensional face database is notified to the computer 1102. Through the configuration in this specific manner, restoration can be performed by referring to the 3-dimensional face measured shape data that is not susceptible to secular changes from the time of registration, even if there is a difference in the facing orientation and the lighting or the expression from those at the time of the registration, when creating the 3-dimensional face restored shape data from the 2-dimensional face image data. Therefore, like the cases of each of the above-described embodiments, the 3-dimensional face restored shape data can be restored with the high accuracy in a short time.

As described above, according to each of the embodiments and the example described-above, the 3-dimensional face collating system of the present invention is required in a 3-dimensional face authentication system, and includes a unit 101 for picking-up face images; a unit 102 for saving the 2-dimensional face images; a unit 103 for restoring the 3-dimensional face shape data; a unit 104 for measuring the face shapes 3-dimensionally; and a unit 107 for saving the 3-dimensional face shape data. The 3-dimensional face shape restoring unit restores the 2-dimensional face image 3-dimensionally by referring to the 3-dimensional face measured shape data. Through employing such a configuration and performing measurements of the 3-dimensional face data by the 3-dimensional face shape measuring unit, the number of the 3-dimensional face measured shape data is increased. Accordingly, the accuracy of restoring the 3-dimensional face shape data is improved. Thus, the object of the present invention can be achieved.

As described above, firstly, the present invention can provide such an effect that the 3-dimensional face authentication system can be effectively operated immediately after its introduction. The reason for this is that it becomes possible to restore the 3-dimensional face shape data from the currently existing 2-dimensional face images by introducing the 3-dimensional face shape restoring unit, and to store the sufficient data in the registered database.

Secondly, the present invention can provide such an effect that the accuracy of restoring the 3-dimensional face shape data becomes more improved as the system operation is continued. The reason is as follows. In storing the 3-dimensional face shape data, the 3-dimensional face shape data are restored by referring to the currently existing 3-dimensional face measured shape data, and the accuracy of the restoration obtained therein is improved in proportion to the amount of data. Therefore, through measuring the 3-dimensional face measured data successively by the 3-dimensional face shape measuring instrument, the data amount can be increased.

The 3-dimensional face registering system of the present invention can also be applied to the case for specifying a suspect from a video image of a picked-up criminal scene by using a face collation technique. Specifically, the 3-dimensional face registering system can be applied to create a 3-dimensional face registered database in a 3-dimensional face collation system that is robust for the factors that affect the face collation accuracy, such as the lighting condition and the facing direction of the face. Further, the 3-dimensional face registering system can be applied to create a 3-dimensional face registered database in a face authentication system for controlling in and out of buildings under a strict security, and for checking a driver of a vehicle and the like.

What is claimed is:

1. A 3-dimensional face data restoring and collating system comprising:

a 2-dimension face image storage unit configured to store a plurality of 2-dimensional face images of persons;

a 3-dimensional face restored shape storage unit;

a 3-dimensional face shape restoring unit configured to restore a 3-dimensional face shape data from one of the plurality of 2-dimensional face images for a target one of the persons based on a 3-dimensional reference face shape data, and to store the 3-dimensional restored face shape data in said 3-dimensional face restored shape storage unit, wherein said 3-dimensional face shape restoring unit restores the 3-dimensional face shape data from the 2-dimensional face image for the target person based on a 3-dimensional measured face shape data corresponding to the 2-dimensional face image;

a 3-dimensional face measured shape storage unit configured to the store 3-dimensional measured face shape data as the 3-dimensional reference face shape data;

a re-restoration instructing unit configured to monitor a number of the 3-dimensional measured face shape data stored in said 3-dimensional face measured shape storage unit and a number of the 3-dimensional restored face shape data stored in said 3-dimensional face restored shape storage unit, and to instruct said 3-dimensional face shape restoring unit to perform a restoring operation to the 2-dimensional face image once again, if the number of said 3-dimensional face measured shape data when the 3-dimensional restored face shape data is obtained, is smaller than a current number of said 3-dimensional face measured shape data; and a registration data matching unit configured to monitor whether the 3-dimensional restored face shape data and 3-dimensional measured face shape data of an identical person are stored in both of said 3-dimensional face restored shape storage unit and said 3-dimensional face measured shape storage unit, and to delete the 3-dimensional restored face shape data from said 3-dimensional face restored shape storage unit when the 3-dimensional restored face shape data and 3-dimensional measured face shape data of only an identical person are stored in both of said 3-dimensional face restored shape storage unit and said 3-dimensional face measured shape storage unit.

2. The 3-dimensional face data restoring and collating system according to claim 1, further comprising:

a 3-dimensional face shape initial data storage unit configured to store a 3-dimensional face shape initial data as the 3-dimensional reference face shape data, wherein said 3-dimensional face shape restoring unit restores the 3-dimensional face shape data from the 2-dimensional face image for the target person based on the 3-dimensional face shape initial data.

3. The 3-dimensional face data restoring and collating system according to claim 2, further comprising:
a 3-dimensional face shape initial data storage unit configured to store the 3-dimensional face shape initial data, and
wherein said 3-dimensional face shape restoring unit restores the 3-dimensional face shape data from the 2-dimensional face images based on the 3-dimensional face shape initial data when there is no 3-dimensional measured face shape data corresponding to the 2-dimensional target face image.

4. The 3-dimensional face data restoring and collating system according to claim 1, wherein a registration data storage section for a collating process comprises said 3-dimensional face restored shape storage unit and said 3-dimensional face measured shape storage unit.

5. The 3-dimensional face data restoring and collating system according to claim 1, further comprising:
an attribute data storage unit configured to store attribute data of the target person in said 2-dimensional face image storage unit and said 3-dimensional face measured shape storage unit for the 2-dimensional face image and the 3-dimensional measured face shape data, respectively; and
a 3-dimensional face shape selecting unit configured to select the 3-dimensional face measured shape data having attribute data close to the attribute data corresponding to the 2-dimensional face image from said 3-dimensional face measured shape storage unit and to output to said 3-dimensional face shape restoring unit, when said 3-dimensional face shape restoring unit restores the 3-dimensional face shape data from the 2-dimensional face image.

6. The 3-dimensional face data restoring and collating system according to claim 5, wherein the attribute data comprises at least one of an age and sex of the target person.

7. The 3-dimensional face data restoring and collating system according to claim 1, wherein all the data stored in the 3-dimensional face measured shape storage unit are set to a referable state.

8. The 3-dimensional face data restoring and collating system according to claim 1, wherein the registration data matching unit comprises a restored shape data deleting unit configured to delete the restored face shape data when the measured face shape overlaps with the restored face shape data.

9. A method of restoring a 3-dimensional face shape data, comprising:
reading out one of a plurality of 2-dimensional face images for a target one of persons from a 2-dimension face image storage unit;
restoring a 3-dimensional face shape data from the 2-dimensional face image based on a 3-dimensional reference face shape data;
storing the 3-dimensional restored face shape data in a 3-dimensional face restored shape storage unit;
measuring a face shape to produce a 3-dimensional measured face shape data as the 3-dimensional reference face shape data;
storing the 3-dimensional measured face shape data in a 3-dimensional face measured shape storage unit;
reading the 3-dimensional measured face shape data corresponding to the 2-dimensional face image from said 3-dimensional face measured shape storage unit in case of the restoration of the 3-dimensional restored face shape data;
monitoring a number of the 3-dimensional measured face shape data stored in said 3-dimensional face measured shape storage unit and a number of the 3-dimensional restored face shape data stored in said 3-dimensional face restored shape storage unit;
generating an instruction to perform a restoring operation to the 2-dimensional face image once again, if the number of said 3-dimensional face measured shape data, when the 3-dimensional restored face shape data is obtained is smaller than a current number of said 3-dimensional face measured shape data;
monitoring whether the 3-dimensional restored face shape data and 3-dimensional measured face shape data of an identical person are stored in both of said 3-dimensional face restored shape storage unit and said 3-dimensional face measured shape storage unit; and
deleting the 3-dimensional restored face shape data from said 3-dimensional face restored shape storage unit when the 3-dimensional restored face shape data and 3-dimensional measured face shape data only of an identical person are stored in both of said 3-dimensional face restored shape storage unit and said 3-dimensional face measured shape storage unit.

10. The method according to claim 9, further comprising:
storing the 3-dimensional face shape initial data in a 3-dimensional face shape initial data storage unit; and
reading the 3-dimensional face shape initial data from said 3-dimensional face shape initial data storage unit in case of the restoration of the 3-dimensional restored face shape data.

11. The method according to claim 9, further comprising:
storing attribute data of the target person in said 2-dimensional face image storage unit and said 3-dimensional face measured shape storage unit for the 2-dimensional face image and the 3-dimensional measured face shape data, respectively; and
selecting the 3-dimensional face measured shape data having attribute data close to the attribute data corresponding to the 2-dimensional face image from said 3-dimensional face measured shape storage unit, when said 3-dimensional face shape restoring unit restores the 3-dimensional face shape data from the 2-dimensional face image.

12. A tangible computer-readable non-transitory storage medium for realizing a method of restoring a 3-dimensional face shape data, said method comprising:
reading out one of a plurality of 2-dimensional face images for a target one of persons from a 2-dimension face image storage unit;
restoring a 3-dimensional face shape data from the 2-dimensional face image based on a 3-dimensional reference face shape data;
storing the 3-dimensional restored face shape data in a 3-dimensional face restored shape storage unit;
monitoring a number of the 3-dimensional measured face shape data stored in said 3-dimensional face measured shape storage unit and a number of the 3-dimensional restored face shape data stored in said 3-dimensional face restored shape storage unit;
generating an instruction to perform a restoring operation to the 2-dimensional face image once again, if the number of said 3-dimensional face measured shape data, when the 3-dimensional restored face shape data is obtained, is smaller than a current number of said 3-dimensional face measured shape data;
storing attribute data of the target person in said 2-dimensional face image storage unit and said 3-dimensional face measured shape storage unit for the 2-dimensional face image and the 3-dimensional measured face shape data, respectively;

selecting the 3-dimensional face measured shape data having attribute data close to the attribute data corresponding to the 2-dimensional face image from said 3-dimensional face measured shape storage unit, when said 3-dimensional face shape restoring unit restores the 3-dimensional face shape data from the 2-dimensional face image; and monitoring whether the 3-dimensional restored face shape data and 3-dimensional measured face shape data of an identical person are stored in both of said 3-dimensional face restored shape storage unit and said 3-dimensional face measured shape storage unit; and deleting the 3-dimensional restored face shape data from said 3-dimensional face restored shape storage unit when the 3-dimensional restored face shape data and 3-dimensional measured face shape data of only an identical person are stored in both of said 3-dimensional face restored shape storage unit and said 3-dimensional face measured shape storage unit.

13. The tangible computer-readable non-transitory storage medium according to claim 12, wherein said method further comprises:

measuring a face shape to produce a 3-dimensional measured face shape data as the 3-dimensional reference face shape data;

storing the 3-dimensional measured face shape data in a 3-dimensional face measured shape storage unit; and reading the 3-dimensional measured face shape data corresponding to the 2-dimensional face image from said 3-dimensional face measured shape storage unit in case of the restoration of the 3-dimensional restored face shape data.

14. The tangible computer-readable non-transitory storage medium according to claim 12, wherein said method further comprises:

storing a 3-dimensional face shape initial data in a 3-dimensional face shape initial data storage unit; and reading the 3-dimensional face shape initial data from said 3-dimensional face shape initial data storage unit in case of the restoration of the 3-dimensional restored face shape data.

15. The tangible computer-readable non-transitory storage medium according to claim 12, wherein said method further comprises:

monitoring whether the 3-dimensional restored face shape data and 3-dimensional measured face shape data of an identical person are stored in both of said 3-dimensional face restored shape storage unit and said 3-dimensional face measured shape storage unit; and deleting the 3-dimensional restored face shape data from said 3-dimensional face restored shape storage unit when the 3-dimensional restored face shape data and 3-dimensional measured face shape data of an identical person are stored in both of said 3-dimensional face restored shape storage unit and said 3-dimensional face measured shape storage unit.

* * * * *